US008881260B1

(12) United States Patent  
Hardin et al.

(10) Patent No.: US 8,881,260 B1  
(45) Date of Patent: Nov. 4, 2014

(54) HIGH ASSURANCE GUARD FOR SECURITY APPLICATIONS UTILIZING AUTHENTICATION AND AUTHORIZATION SERVICES FOR SOURCES OF NETWORK DATA

(75) Inventors: David S. Hardin, Cedar Rapids, IA (US); Raymond J. Richards, Marion, IA (US); Matthew M. Wilding, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 320 days.

(21) Appl. No.: 12/893,796

(22) Filed: Sep. 29, 2010

(51) Int. Cl.  
*H04L 29/06* (2006.01)  
*H04L 12/26* (2006.01)

(52) U.S. Cl.  
CPC ............... *H04L 43/18* (2013.01); *H04L 63/12* (2013.01); *G06F 2221/2113* (2013.01)  
USPC ................ 726/12; 726/9; 726/11; 370/352

(58) Field of Classification Search  
CPC .. H04L 43/18; H04L 63/12; G06F 2221/2113  
USPC .................................. 726/9, 11, 12; 370/352  
See application file for complete search history.

(56) References Cited

U.S. PATENT DOCUMENTS

| 6,374,286 | B1* | 4/2002 | Gee et al. ............... 718/108 |
| 2005/0257267 | A1* | 11/2005 | Williams et al. ............. 726/25 |
| 2007/0204337 | A1* | 8/2007 | Schnackenberg et al. ...... 726/11 |
| 2008/0060076 | A1* | 3/2008 | Webb et al. ............... 726/25 |
| 2009/0129385 | A1* | 5/2009 | Wray et al. ............... 370/392 |
| 2009/0199286 | A1* | 8/2009 | Singhal ................... 726/9 |
| 2009/0254985 | A1* | 10/2009 | Weller et al. .............. 726/11 |
| 2011/0122861 | A1* | 5/2011 | Benco et al. .............. 370/352 |

OTHER PUBLICATIONS

Lenczner, "Wireless Portals with Wifidog", Oct. 31, 2005, Linux Journal, p. 82-84.*  
Software Technology Support Center, USA, "Cross-Domain Information Sharing in a Tactical Environment", by Mel Crocker, published in the Mar. 2007 issue of CrossTalk, The Journal of Defense Software Engineering, http://www.stsc.hill.af.mil/crosstalk/2007/03/index.html.

* cited by examiner

*Primary Examiner* — Mahfuzur Rahman  
*Assistant Examiner* — Gregory Lane  
(74) *Attorney, Agent, or Firm* — Donna P. Suchy; Daniel M. Barbieri (57) ABSTRACT

Cross-Domain guard with authentication and authorization function used to protect data transferred between two separate and secure networks. The guard utilizes an existing audit port to provide the capability augment or replace data-forwarding decisions, which were previously being based solely on whether the data is in a well-formed packet. The authentication and authorization may be resident in a partition, a side car processor or a separate network.

15 Claims, 8 Drawing Sheets

FIG. 8

HIGH ASSURANCE GUARD FOR SECURITY APPLICATIONS UTILIZING AUTHENTICATION AND AUTHORIZATION SERVICES FOR SOURCES OF NETWORK DATA

CROSS REFERENCE

This application is a continuation-in-part application of, claims the benefit of the filing data of, and incorporates herein in its entirety by reference U.S. patent application Ser. No. 11/820,351 entitled: "Evaluatable High-Assurance Guard for Security Applications" filed Mar. 2, 2006, which itself is a continuation-in-part of an application now issued as U.S. Pat. No. 7,606,254, the content of which is also incorporated herein in its entirety by this reference.

FIELD OF THE INVENTION

The present invention relates to high assurance guards used in communication between secure computer networks.

BACKGROUND OF THE INVENTION

High assurance guards have been long used to facilitate communication between highly secure networks. Identity and permission management systems have been suggested for use in cross-domain systems. However, the methods suggested in the past, such as in an article by Mel Crocker in the March 2007 issue of Cross-Talk, The Journal of Defense Software Engineering, entitled *Cross-Domain Information Sharing in a Tactical Environment*, may suffer from requirements for heavy encryption and from a distributed local audit. Traditional cross-domain systems, such as the Turnstile system currently sold by Rockwell Collins Inc., are capable of examining individual protocol data packets and determining whether those packets should be transmitted from one secure network to another secure network, based upon a set of rules. However, in such cross-domain systems to achieve the desired performance, it is necessary to avoid the encryption overhead and distributed audit systems and instead currently trust that the source of these data packets is authentic and the source is authorized to send these types of packets.

Consequently, there exists a need for eliminating non=authentic sources of data and unauthorized sources of data in such cross-domain systems, while not unduly burdening the core cross domain system with complex authentication and authorization processing.

SUMMARY OF THE INVENTION

It is an object of the present invention to increase security in high assurance cross-domain systems.

It is a feature of the present invention to utilize authentication systems and methods for determining if a source of data on such high assurance cross-domain systems is authentic.

It is another feature of the present invention to utilize authorization systems and methods for determining if a source of data on such high assurance cross-domain systems is authorized to provide such data on such cross-domain system.

It is an advantage of the present invention to reduce the detriment caused by data from non-authentic and unauthorized data sources on high assurance cross-domain systems.

It is another feature of the present invention to utilize an audit network in the guard of the cross-domain system.

It is still another feature of the present invention to utilize an isolated ancillary processor or "side car" processor located on an audit network of a guard of the cross-domain system.

The present invention is high assurance guard for a cross-domain system which achieves the stated objects and advantages and includes the previously mentioned features.

The present invention comprises:

A system for guarding communication between two separate and secure networks, the system comprising:

a guard disposed between a first secure network and a second secure network, which is separated from said first network;

the guard performing at least two of the following operations before allowing a data packet to flow from between said first secure network and said second secure network:

determining that said data packet is well formed in accordance with a predetermined protocol;

determining that said data packet is authentic; and determining that said data packet is from an authorized source.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
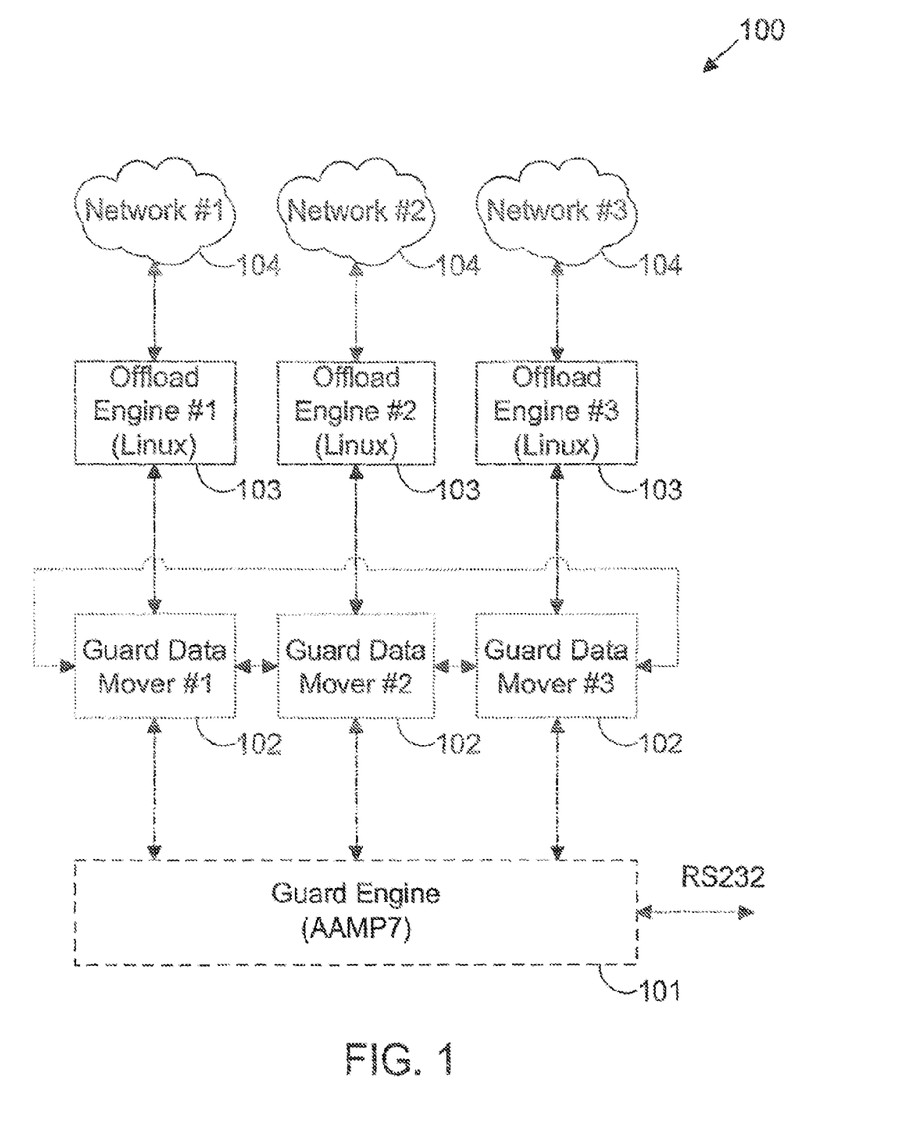
FIG. 1 is a block diagram of a device for routing information between networks of differing security level, in accordance with an exemplary embodiment of the present invention.

FIG. 1 illustrates a block diagram of a device 100 for routing information between networks of differing security level, in accordance with an exemplary embodiment of the present invention. The device 100 enforces a security policy on a data flow. As shown, the device 100 is capable of connecting to three different networks 104. However, the device 100 may be capable of connecting to different numbers of different networks 104 without departing from the scope of the present invention. Communication to and from each network 104 is handled by a dedicated Offload Engine (OE) 103. Each Offload Engine 103 includes an interface for connecting to an external network 104. The interface may include, but is not limited to a 10/100 Ethernet interface and an RS232 interface. Each OE 103 interfaces to a Guard Engine 101 through a Guard Data Mover (GDM) 102.

A first OE 103 receives a data packet from a first network 104 intended to be transmitted to a second network 104. The data packet may be intended to be, transmitted to a second network 104 if a header of the data packet specifies the second network 104 as a destination for the data packet. The Guard Engine 101 analyzes the data packet. The Guard Engine 101 may include an ACL (access control list) which are rules that data packets must meet before being passed onto a destination network. If allowed by the ACL, the Guard Engine 101 delivers the data packet to the second network 104 via a second OE 103 utilizing a GDM 102 associated with the first OE 103 and a GDM associated with the second OE 103. The Guard Engine 101 may generate an audit record. The audit record may include, but is not limited to health status of the OEs 103 and the Guard Engine 101 and failed data packet transmission attempts. The Guard Engine 101 may deliver the audit record to the first network 104 via the first GDM 102 and the first OE 103, the second network 104 via the second GDM 102 and the second OE 103, or a third network 104 (which may be an audit network) via a third GDM 102 and a third OE 103.

A data packet may be defined as a fundamental unit of information carriage in all modern computer networks that implement packet switching. For instance, the data packet may include a header which contains information that may be used to forward the data packet from its source to its destination. Further, the data packet may include a data area which contains information about a user who caused the creation of the data packet. Additionally, the data packet may include a trailer which may contain techniques for ensuring that errors do not occur during data transmission.

Figure 2:
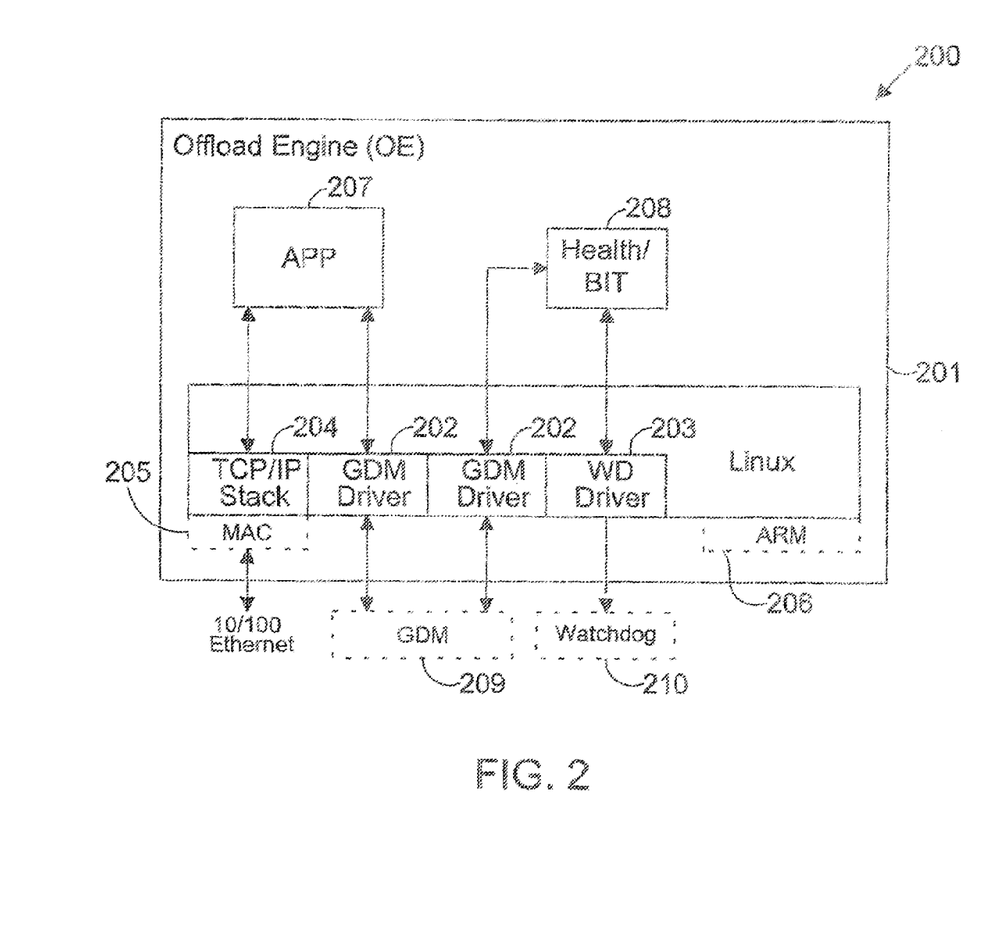
FIG. 2 is a block diagram of an Offload Engine, in accordance with an exemplary embodiment of the present invention.

Referring to FIG. 2, each OE 200 may consist of a Linux operating system 201 which includes drivers 202 and 203 for the GDM 209 and a watchdog unit 210. A TCP/IP stack 204 may be provided with an interface to a 10/100 Mbit Ethernet MAC (media access control) device 205. The OE software may be hosted on an ARM processor (a 32-bit RISC (reduced instruction set computer) processor utilized in a number of embedded designs) 206. Executing on the Linux operating system may be both the system integrator supplied applications 207 and a health monitoring and Built-In Test (BIT) application 208. The system integrator applications 207 and any data associated with them are referred to as "configuration data."

Figure 3:
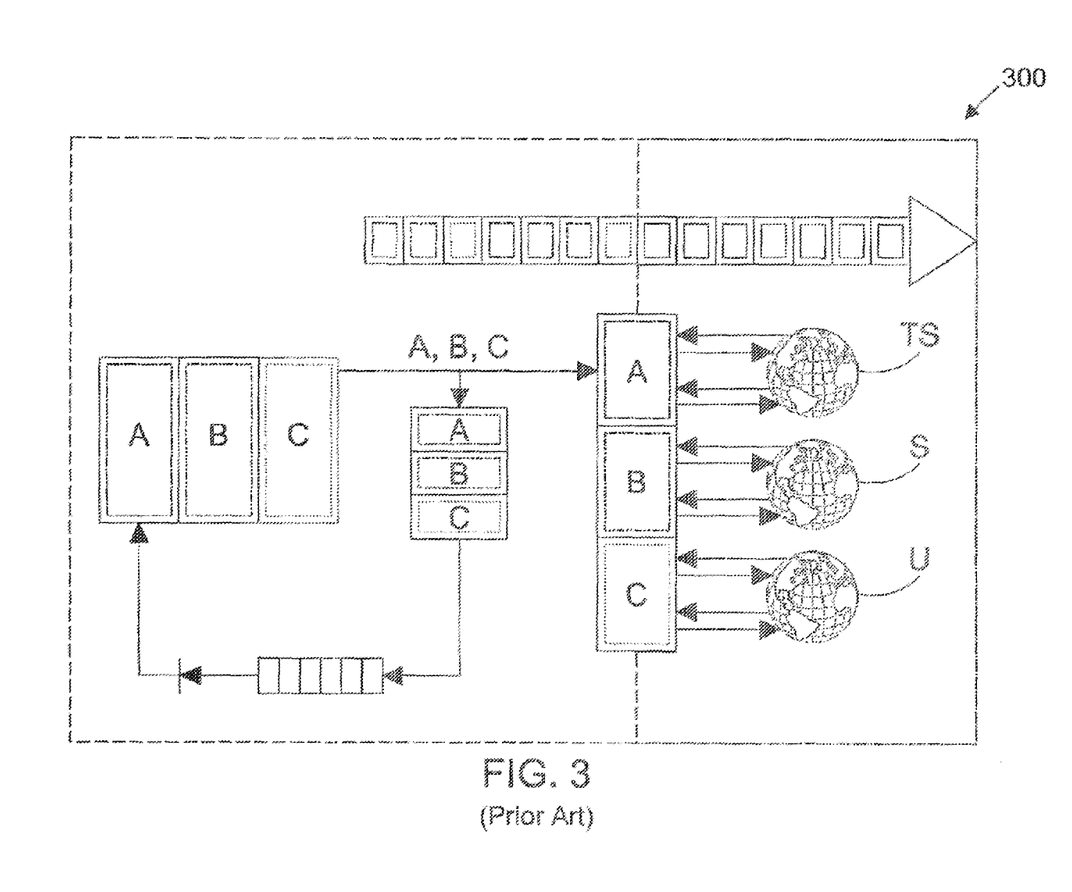
FIG. 3 is a block diagram illustrating the intrinsic partitioning of the AAMP7 microprocessor, as is known in the art.

The Guard Engine 101 may be based on the AAMP7 (Advanced Architecture MicroProcessor 7) microprocessor (a microprocessor with an intrinsic partitioning architecture designed for use in embedded systems). The intrinsic partitioning, the NSA (National Security Agency), MILS (Multiple Independent Levels of Security) certification of the AAMP7G (Advanced Architecture MicroProcessor 7 Government Version), and formally analyzed software provide a high-assurance compute core for the enforcement of a security policy. Intrinsic partitioning is an architectural feature of the AAMP7 which allows the integration of multiple applications in a way that allows for their assured separation. Partitions are processing contexts where communication between partitions is limited to what is allowed by an information flow policy. A partitioned system is capable of supporting MILS which is necessary for integration of multiple secured applications into a single embedded system. The intrinsic partitioning mechanism operates as a separation kernel implemented in microcode. Referring to FIG. 3, rather than managing operating system tasks, however, the intrinsic partitioning mechanism maintains appropriate separation between a set of system partitions implemented directly in the micro-architecture and associated microcode. The AAMP7 is designed to enforce a communication policy between partitions that ensure that improper communication is not allowed, thereby providing a system designer a useful and dependable building block for designing and implementing secure systems.

A system has intrinsic partitioning if it is designed from the ground up to enforce this kind of brick wall separation. Intrinsic partitioning, such as that natively supported by the AAMP7 microprocessor, provides absolute assurance of the spatial and temporal separation between partitions. The underlying processing platform enforces a policy of information flow between partitions with mechanisms that are designed into the machine itself, not added later at the operating system or application levels. This approach results in a simpler separation mechanism, reflecting the fact that the myriad implementation details that need to be verified to ensure security of the system are typically low-level considerations. These considerations, including whether all user instructions adhere to memory protection policies; whether a user partition can deny processing to other partitions, whether caches are shared between partitions, and other low-level details that are crucial for security. To ensure that highly sensitive data can be securely mixed with data and programs at lower or unclassified levels requires a separation mechanism that is best implemented and certified at a low level of the design.

Figure 4:
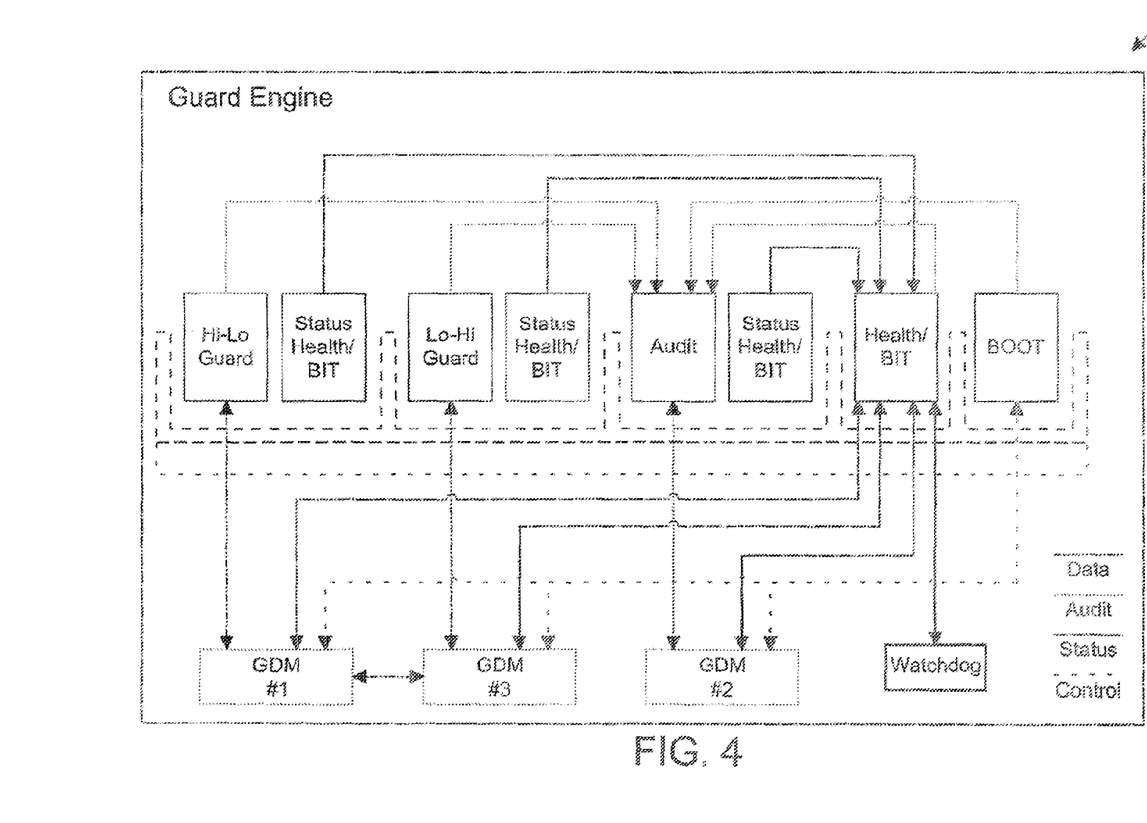
FIG. 4 is a block diagram illustrating the interaction between the Guard Engine hardware and software, in accordance with an exemplary embodiment of the present invention.

Referring to FIG. 4, the interaction 400 between the Guard Engine 101 hardware and software is illustrated. As illustrated, the Guard Engine 101 interacts with three GDMs. However, the Guard Engine 101 may be capable of interacting with different numbers of GDMs without departing from the scope of the present invention. The present invention may rely on intrinsic partitioning to enforce which applications are allowed to configure hardware, review messages and approve their transmission through the guard, and finally to manage health and audit functions. The separation provided by intrinsic partitioning may help simplify analysis of the various functions of the present invention.

Figure 5:
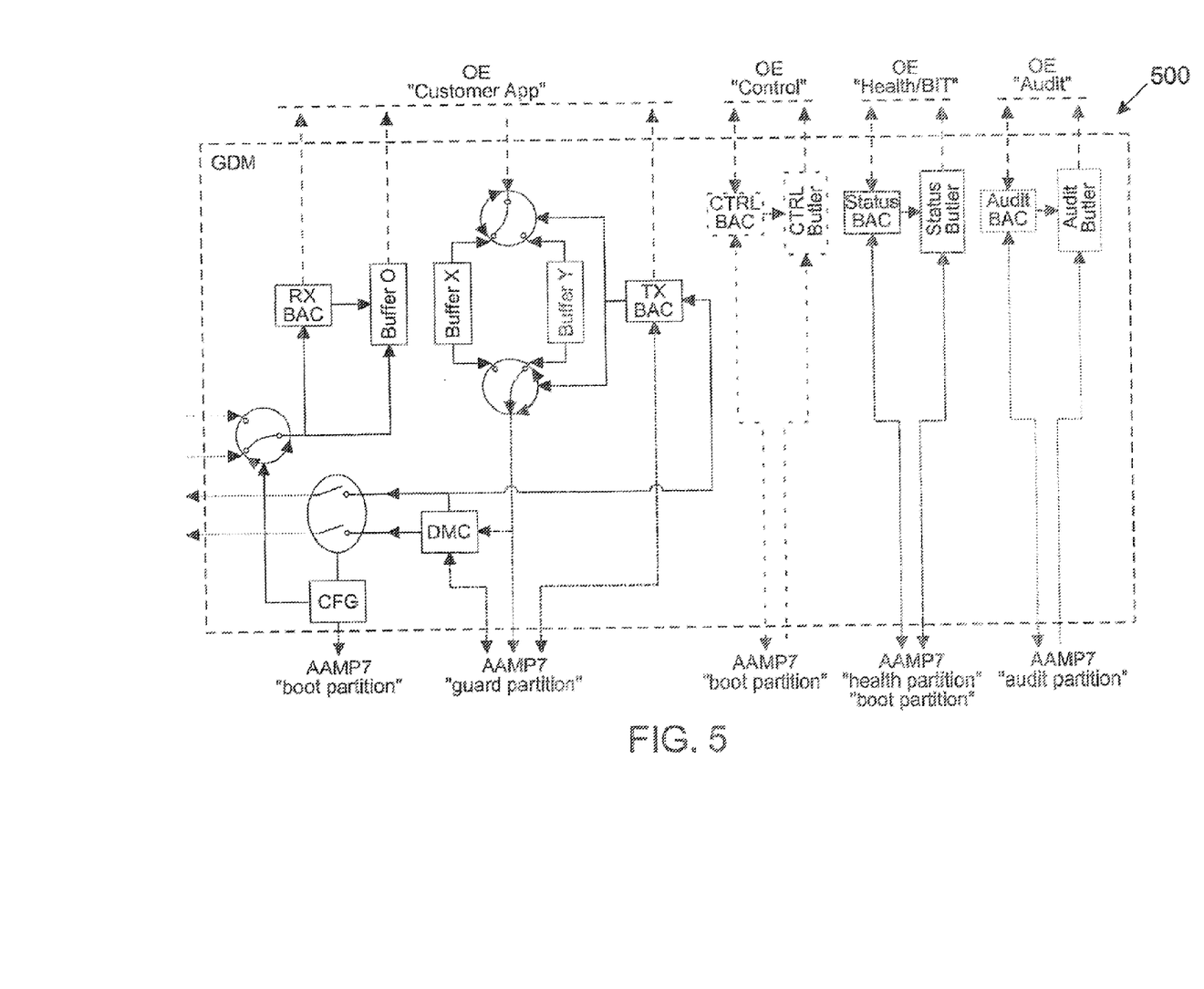
FIG. 5 is a block diagram illustrating the high-level interaction between the Guard Engine software, the Offload Engine software, and the Guard Data Mover, in accordance with an exemplary embodiment of the present invention.

The GDM 102 may comprise an FPGA (field programmable gate array) based engine that provides independent data channels that allow the Guard Engine 101 and OEs 103 to communicate in a high-assurance manner. The GDM 102 may include four main functions/data paths. However, the GDM 102 may include different numbers of functions/data paths without departing from the scope of the present invention. The first may act as an accelerator to move data between networks of differing levels of security under direction of the Guard Engine 101. This may provide a significant performance boost by alleviating the need for the Guard Engine 101 to move every byte of a data message to the intended OE 103. The GDM 102 does not make any independent decisions to move data. Rather, the GDM 102 relies on the Guard Engine 101 to analyze the message and initiate the transfer. The second function may provide a separate data path for the OEs 103 to pass health & BIT status messages to the Guard Engine 101. This data path may be unidirectional, so that data can only flow into the Guard Engine 101. The third function may provide a data path for the Guard Engine to pass control messages to the OE 103. This data path may be unidirectional so that control can only flow from the Guard Engine 101 to the OE 103. The fourth function may provide an interface for the Guard Engine 101 to pass audit messages to the OE 103. Audit data may be defined as system-generated data which corresponds directly to recorded actions taken by identifiable and authenticated users. This interface may be unidirectional so that the audit messages can flow only from the Guard Engine 101 to the OE 103. FIG. 5 illustrates the high-level interaction 500 between the Guard Engine 101 software, OE 103 software, and the GDM 102.

Figure 6:
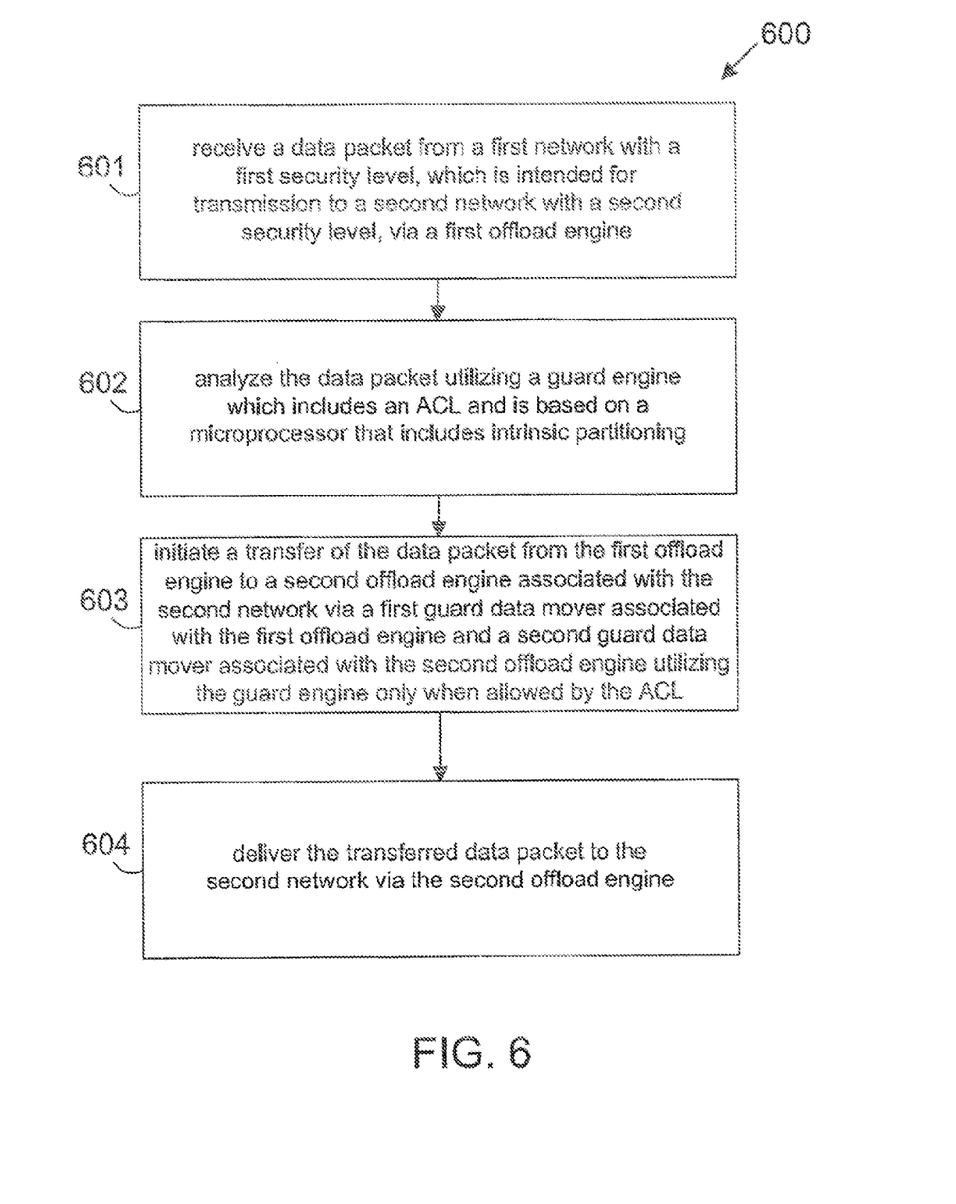
FIG. 6 is a flowchart illustrating a method for routing information between networks of differing security level, in accordance with an exemplary embodiment of the present invention.

FIG. 6 is a flowchart illustrating a method 600 for routing of information between networks of differing security level, in accordance with an exemplary embodiment of the present invention. In step 601, a data packet is received from a first network with a first security level, which is intended for transmission to a second network with a second security level, via a first offload engine. In step 602, the data packet is analyzed utilizing a guard engine which includes an ACL and is based on a microprocessor that includes intrinsic partitioning. In step 603, a transfer of the data packet from the first offload engine to a second offload engine associated with the second network via a first guard data mover associated with the first offload engine and a second guard data mover associated with the second offload engine is initiated, utilizing the guard engine only when allowed by the ACL. In step 604, the transferred data packet is delivered to the second network via the second offload engine.

During previous high-assurance certification evaluations, intrinsic partitioning mechanisms have been mathematically proven correct. This reduces the amount of software which needs to be evaluated to a high Evaluation Assurance Level (EAL). Further, the very nature of the intrinsic partitioning architecture allows the amount of critical code to be small, since it is unburdened by complex inter-process communications software that may be found in operating systems for general-purpose microprocessors. Proofs of correctness may proceed from a symbolic simulation of critical code of the present invention utilizing a formal model. An automated theorem prover, such as an ACL2 (A Computational Logic for Applicative Common LISP (List Processing)), may then be utilized to perform detailed proof steps for establishing correctness. Each of the above-referenced factors may promote ease of evaluation when trying to attain high-assurance certification of the present invention by reducing the time and effort needed for evaluation.

It is to be noted that the foregoing described embodiments according to the present invention may be conveniently implemented using conventional general-purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

Reference will now be made in detail to the presently preferred embodiments of the invention, examples of which are illustrated in the accompanying drawings.

Figure 7:
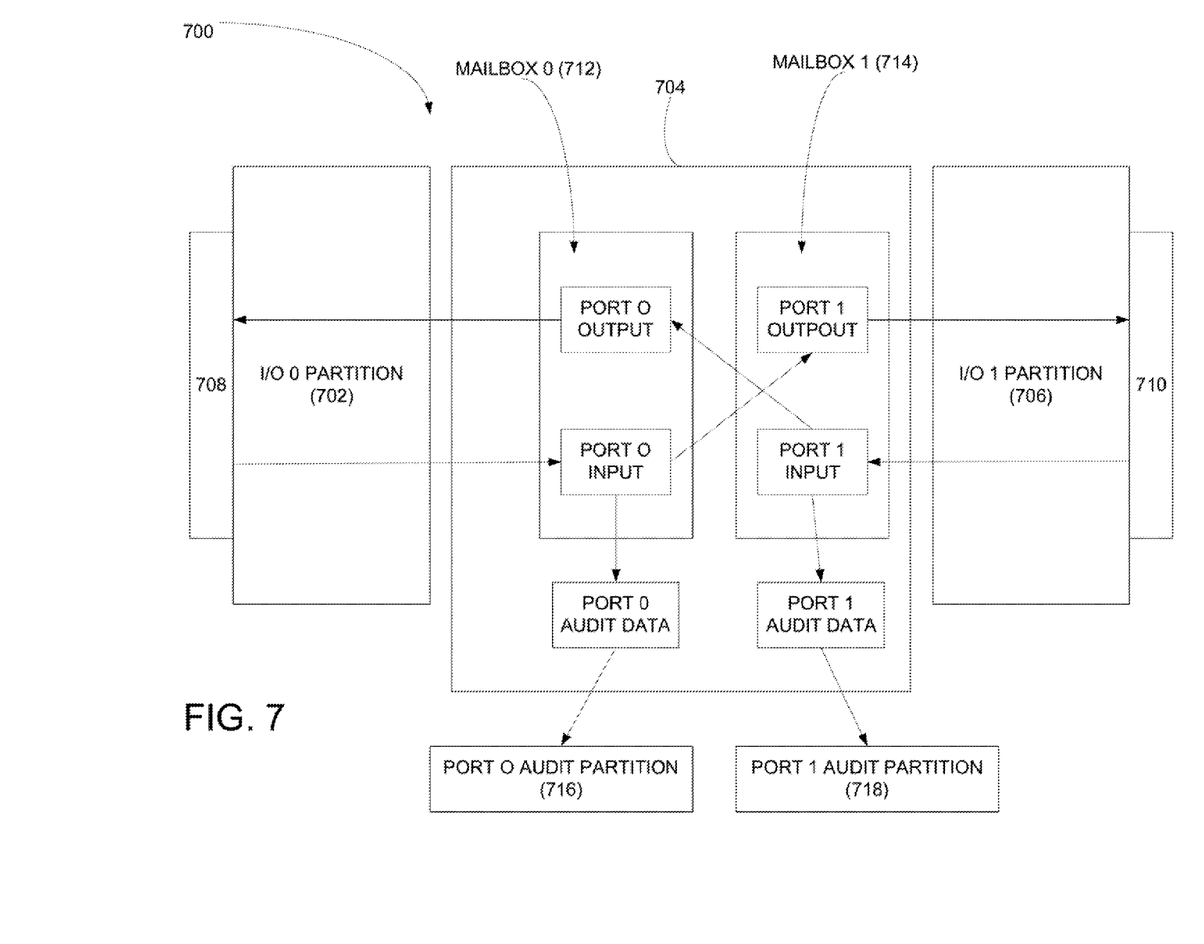
FIG. 7 is a block diagram of a partitioned processing system implementing a high-assurance guard in accordance with an exemplary embodiment of the present invention.

FIG. 7 illustrates a block diagram configuration for a partitioned processing system 700 implementing a high-assurance guard in accordance with an exemplary embodiment of the present invention. Included in the illustrated configuration is a first input/output (I/O) 0 partition 702, a guard function partition 704 and a second input/output (I/O) 1 partition 706. In a present embodiment, the first I/O 0 partition 702 is communicatively coupled with the second I/O 1 partition 706 via the guard function partition 704. In the exemplary embodiment, the first I/O 0 partition 702 and the second I/O 1 partition 706 are configured for handling I/O traffic. Further, I/O port hardware, such as a first I/O port 0 hardware 708 and a second I/O port 1 hardware 710 may be communicatively coupled with the first I/O 0 partition 702 and the second I/O 1 partition 706 respectively. For example, a data packet may be input via the first I/O port 0 hardware 708 and received by the guard function partition 704 via the first I/O 0 partition 702. In current embodiments, the first and second I/O ports (708, 710) may be a variety of ports, such as parallel ports, USB ports or the like. A data packet may be defined as a fundamental unit of information carriage in all modern computer networks that implement packet switching. For instance, the data packet may include a header, which contains information that may be used to forward the data packet from its source to its destination. Further, the data packet may include a data area which contains information about a user who caused the creation of the data packet. Additionally, the data packet may include a trailer which may contain techniques for ensuring that errors do not occur during data transmission.

In the present embodiment, the guard function partition 704 includes a first mailbox 0 (712) for receiving the data packet from the first I/O 0 partition 702. The guard function partition 704 is configured for checking the format of the data packet to determine if the received data packet is well-formed. For example, a data packet may be determined to be well formed if it is free of packet errors. In the present embodiment, an Interface Control Document (ICD) or similar documentation, defines what constitutes a well-formed data packet. The ICD may describe the format of commands that may be issued over an interface using some lower level protocol (e.g., the RS-232 protocol), as well as describing the format of responses that should be received. For instance, if a data packet received by the guard function partition 704 includes a correct length in bytes, has sub-fields that are of the right format, etc., then the data packet may be determined by, the guard function partition to be well formed. It is further contemplated that interface control information may be implemented via various forms of documentation, such as via an I/O Format Description Document, comments in driver source code, or the like. In the exemplary embodiment, when the data packet received by the guard function partition 704 is well formed, it is forwarded via a second mailbox 1 (714) (of the guard function partition 704) to the second I/O 1 partition 706, where it may be output via the second I/O port 1 hardware 710. Further, when the data packet received by the guard function partition 704 is not well formed, it is not forwarded to the second I/O 1 partition 706. In this manner, the guard function partition 704 is configured to provide guard functionality for selectively allowing inter-process communication between the first I/O 0 partition 702 and the second I/O 1 partition 706 in accordance with defined communication parameters/policy of the partitioned processing system 700.

Each mailbox (712, 714) may include a mutual exclusion synchronization mechanism, such as a binary semaphore, for controlling access to the mailbox. A semaphore may be defined as a hardware or software flag. Further, in multitasking systems, a semaphore may be a variable with a value that indicates the status of a common resource. The semaphore may be used to lock the resource that is being used. For instance, a process needing the resource may check the semaphore to determine the resource's status and then decide how to proceed. Further, each mailbox (712, 714) may include one writer (producer) and one reader (consumer). Additionally, memory regions utilized by the mailboxes and semaphores may be allocated at link time.

As shown in the illustrated embodiment, the guard function partition 704 of the present invention may be subpartitioned to include a first subpartition responsible for guarding data being directed from the first I/O 0 partition 702 to the second I/O 1 partition 706, and a second subpartition, responsible for guarding data being directed from the second I/O 1 partition 706 to the first I/O 0 partition 702.

Additionally, a first audit port 0 audit partition 706 and a second port 1 audit partition 718 may be communicatively coupled with the guard function partition 704 for receiving audit data corresponding to data received by the guard function partition from the first I/O 0 partition 702 and the second I/O 1 partition 706 respectively. Audit data may be defined as system-generated data which corresponds directly to recorded actions taken by identifiable and authenticated users, associated under a unique audit identifier (audit ID). It should be further noted that, in further embodiments, the first and second audit partitions (716, 718) illustrated in FIG. 7 may be combined into a single system-wide audit partition, or even in an independent side car processor or entirely separate networks.

In current embodiments, the first I/O 0 partition 702, the guard function partition 704, the second I/O 1 partition 706, the first port 0 audit partition 716 and the second port 1 audit partition 718 may be partitions of an AAMP7 (Advanced Architecture Micro Processor Model 7) microprocessor. When an AAMP7 microprocessor is implemented, the partition manager of the AAMP7 ensures that only one partition of the partitioned processing system is active at any one time. Further, the partition manager of the AAMP7 includes partition access rights defined so that physical memory allocated to the mailboxes and the semaphores may only be read and/or written by a partition included in the group consisting of: the first I/O 0 partition 702; the guard function partition 704; the second I/O 1 partition 706; the first port 0 audit partition 716; and the second port 1 audit partition 718. The AAMP7 partitioned processing system further ensures that no application software may alter the system's partitioning data structures. Additionally, access to the semaphores may be limited to a partition included in the group consisting of: the first I/O 0 partition 702; the guard function partition 704; the second I/O 1 partition 706; the first port 0 audit partition 716; and the second port 1 audit partition 718.

Figure 8:
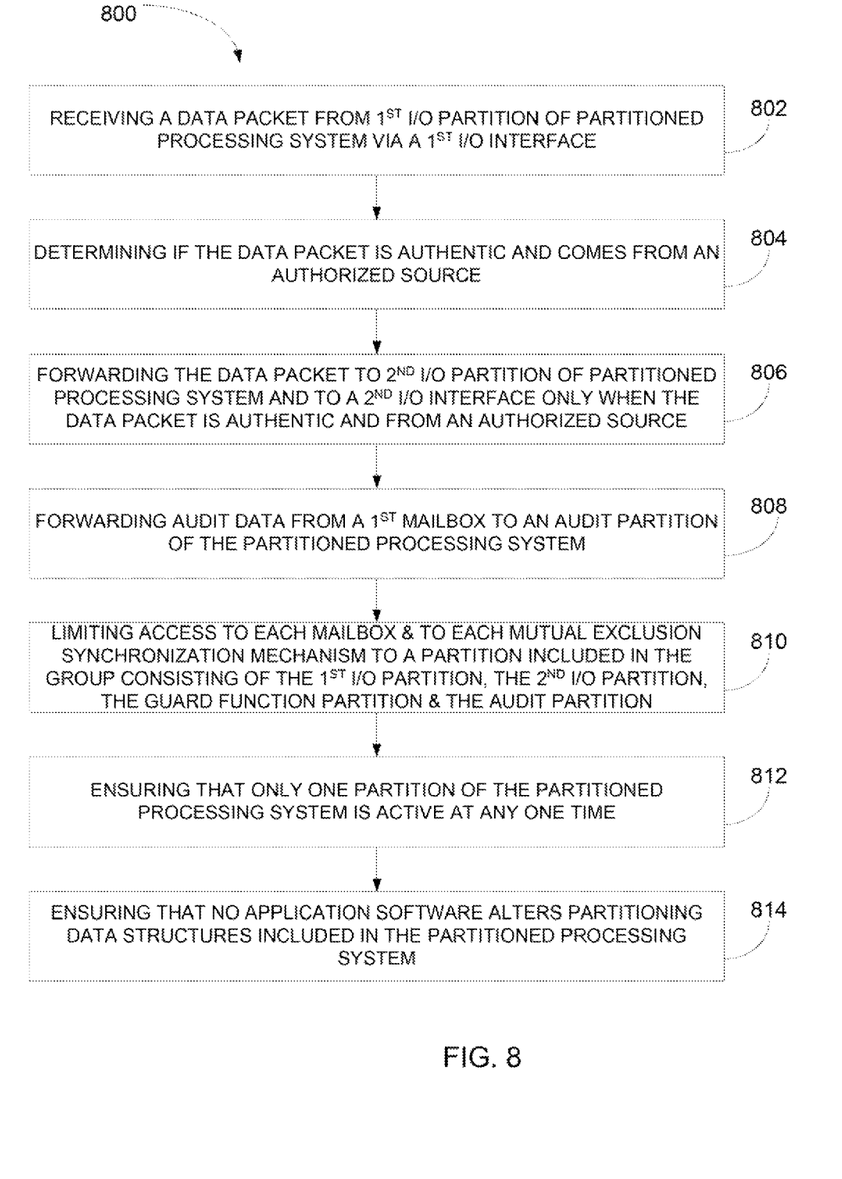
FIG. 8 is a flowchart illustrating a method for providing a high-assurance guard with authentication and authorization services in a partitioned processing system in accordance with an exemplary embodiment of the present invention.

FIG. 8 is a flowchart illustrating a method for providing a high-assurance guard in a partitioned processing system, the partitioned processing system including a first I/O partition, a guard function partition and a second I/O partition, in accordance with an exemplary embodiment of the present invention. The method 800 includes receiving a data packet from a first I/O interface via the first I/O partition of the partitioned processing system 802. For instance, in the present embodiment, the data packet is received in a first mailbox 0 (712). The method 800 further includes determining if the data packet is authentic and originating from an authorized source. In a preferred embodiment the authentication and authorization services are accessed via the audit partition; however, this is not essential. The method 800 further includes forwarding the data packet to the second I/O partition of the partitioned processing system and to a second I/O interface 806 only when the data packet is both authenticated and from an authorized source. For example, in the exemplary embodiment, the data packet is forwarded to the second I/O partition via a second mailbox 1 (714). In the exemplary embodiment, the first and second mailboxes each include a mutual exclusion synchronization mechanism, such as a binary semaphore, for controlling access to the mailboxes. The method 800 further includes forwarding audit data from the first mailbox to an audit partition of the partitioned processing system 808. The method 800 further includes limiting access to each mailbox and to each mutual exclusion synchronization mechanism to a partition included in the group consisting of: the first I/O partition; the second I/O partition; the guard function partition; and the audit partition 810. The method 800 further includes ensuring that only one partition of the partitioned processing system is active at any one time 812. For instance, in current embodiments, the partition manager of an AAMP7 microprocessor may ensure that only one partition of the partitioned processing system is active at any one time. The method 800 further includes ensuring that no application software alters partitioning data structures included in the partitioned processing system 814. Authentication and authorization steps are well known in other industries and details of how other systems are configured etc., to achieve similar results is omitted because a person skilled in the art who has read the present application and the applications from which it depends, will understand how to make and use the present invention.

It is to be noted that the foregoing described embodiments according to the present invention may be conveniently implemented using conventional general-purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

In embodiments in which the above-described guard functionality is implemented as a software package for execution upon an AAMP7 microprocessor, ease of evaluation of the guard software is promoted. For example, the guard software may be divided across the first I/O partition, the second I/O partition, the guard function partition, the first audit partition and the second audit partition of the AAMP7 microprocessor. The AAMP7 microprocessor has an intrinsic partitioning mechanism for ensuring that processes running in different partitions are segregated from one another. During previous evaluations to attain high-assurance certification, this intrinsic partitioning mechanism has been mathematically proven to be correct. When implementing the guard software with the AAMP7 as described above, the assumption can safely be made, for instance, that the critical "guard function" (i.e., format checking) code, executing in the guard function partition 704, will be isolated from non-critical I/O code executing in I/O partitions (702, 706). This reduces the amount of software which needs to be evaluated to a high Evaluation Assurance Level (EAL) to only that portion of the software executing within the guard function partition (i.e., that portion of the software which contains the format checking code). Further, the very nature of the AAMP7's partitioning architecture (i.e., single address space, base-and-bounds memory protection, low-latency partition switching) allows the amount of critical "guard function" code to be small, since it is unburdened by complex inter-process communications software that may be found in operating systems for general-purpose microprocessors. Proofs of correctness may proceed from a symbolic simulation of the critical "guard function" code of the present invention by utilizing a formal model of the AAMP7's instruction set processing. An automated theorem prover, such as an ACL2 (A Computational Logic for Applicative Common LISP (List Processing)), may then be used to perform detailed proof steps for establishing correctness of the guard software. Each of the above-referenced factors may promote ease of evaluation when trying to attain high-assurance certification of the guard software of the present invention by reducing the time and effort needed for evaluation.

We claim:

1. A system for guarding communication between two separate and secure networks, the system comprising:
- a guard, executed by a partitioned microprocessor and disposed between a first secure network and a second secure network, which is separated from said first network; said guard is separated from both said first secure network and said second secure network by a partition;
- the guard performing the following operations before allowing a data packet to flow from between said first secure network and said second secure network:
- determining that said data packet is well formed in accordance with a predetermined protocol;
- determining that said data packet is authentic; and determining that said data packet is from an authorized source; and wherein said operations are performed via an audit port which is a partition of said partitioned microprocessor, wherein said audit port connects to a side car processor; and
- said partitioned microprocessor having only one partition active at any one time.

2. The system of claim 1 wherein said first network terminates at a first input/output port, and said second network terminates at a second input/output port, and said data packet remains on its originating side of the guard unless and until access across said guard is granted.

3. The system of claim 1 wherein said two operations are selected among the steps of:
- determining that said data packet is authentic; and
- determining that said data packet is from an authorized source.

4. The system of claim 1 wherein said audit port comprises a third network separate from both first secure network and said second secure network other than through said audit port.

5. The system of claim 3 wherein said step of determining that said data packet is authentic comprises a step of a signature comparison.

6. The system of claim 1 wherein said step of determining that said data packet is from an authorized source comprises a step of querying a database of authorized users.

7. The system of claim 3 wherein said guard applies variable thresholds of authentication and authorization, depending upon a classification tag applied to said data packet.

8. The system of claim 7 wherein said guard creates an illusion that first secure network is a portion of the second secure network when said data packet is allowed to pass the guard.

9. A method of guarding communication between two separate and secure networks, the system comprising:
- providing a guard, executed by a partitioned microprocessor disposed between a first secure network and a second secure network, which is separated from said first network, were said guard is separated from both said first secure network and said second secure network by a partition;
- performing the following operations before allowing a data packet to flow from between said first secure network and said second secure network:
- determining that said data packet is well formed in accordance with a predetermined protocol;
- determining that said data packet is authentic; and determining that said data packet is from an authorized source; and wherein said operations are performed via an audit port which is a partition of said partitioned microprocessor, wherein said audit port comprises a side car processor; and
- ensuring that only one partition of said partitioned microprocessor is active at any one time.

10. The method of claim 9 wherein said first network terminates at a first input/output port, and said second network terminates at a second input/output port, and said data packet remains on its originating side of the guard unless and until access across said guard is granted.

11. The method of claim 9 wherein said two operations are selected among the steps of:
- determining that said data packet is authentic; and
- determining that said data packet is from an authorized source.

12. The method of claim 9 wherein said audit port connects to a third network separate from both first secure network and said second secure network other than through said audit port.

13. The method of claim 11 wherein said step of determining that said data packet is authentic comprises a step of a signature comparison.

14. The method of claim 9 wherein said step of determining that said data packet is from an authorized source comprises a step of querying a database of authorized users.

15. The method of claim 11 wherein said guard applies variable thresholds of authentication and authorization, depending upon a classification tag applied to said data packet.

* * * * *